UNITED STATES PATENT OFFICE.

JONATHAN H. GREEN, OF CHRISTIANSBURG, IOWA.

COMPOSITION FOR COVERING METALS.

Specification forming part of Letters Patent No. 26,267, dated November 29, 1859.

*To all whom it may concern:*

Be it known that I, JONATHAN H. GREEN, of Christiansburg, in the county of Wapello and State of Iowa, have invented a Composition for Covering Metals and other Substances, which I have described in the following specification with sufficient clearness to enable competent and skillful workmen in the arts to which it pertains or is most nearly allied to make and use my invention.

My said invention consists in an improved elastic composition for covering metals, hard wood, or any other substances which from their nature are capable of receiving it, and which may also be used for coating the inside of vessels and water-pipes and for luting in chemical experiments, &c.

This composition is made as follows: I take six ounces of emery, four ounces of pumice-stone, two ounces of corundum, two ounces of Paris white, one ounce of lamp-black, two ounces of magnesia, three ounces of india-rubber cement or gutta-percha cement, (consisting of a saturated solution of india-rubber in camphene or a solution of gutta-percha of similar strength in any substance which will properly dissolve it,) one pint of linseed-oil, one-half pint of turpentine, and one gill of slone japanner's varnish. I grind all these together in one body, so as to bring them to the consistence of oil-paint. Should the composition, when mixed up and ground, be too thick, I add as much spirits of turpentine as will be necessary to bring it to the desired consistence. I have found the foregoing proportions, however, to answer very well for a thin coat. This composition, when so prepared, may be applied by submergence or otherwise to the surface of any substance capable of receiving it, and when so applied I subject it to the influence of a sufficient degree of heat to dry it, varying from 140° to 300° Fahrenheit, although I am not certain that exposure to the solar rays would not effect the same purpose.

The hardness and elasticity of this composition (qualities which are not combined in any varnish or enamel, at least not to the same degree) render it capable of being applied to many purposes to which varnish or enamel cannot be applied so as to produce the same useful effect, among which may be enumerated the following:

First. If applied to the surfaces of a thin sheet of metal—say iron or copper—it renders the metal capable of being used as a school-slate, its peculiar hardness causing it to act effectively on a common slate-pencil. If the metallic sheet be large enough, it may be used as a blackboard.

Second. If a coating of it be applied to the inside of a vessel composed of different pieces put together—say, for instance, a common tin can—it is an effectual preventative of leakage.

Third. If the lid of the same vessel be placed in position and luted with this composition, it renders the vessel perfectly air-tight, thereby furnishing a desideratum in forming air-tight cans for the preservation of meats for long sea voyages, without resorting to the tedious and very often ineffectual process of soldering.

Fourth. Its toughness and elasticity are such that when applied to the surface of a thin metallic plate the plate may be bent and straightened many times in succession without separating in the smallest degree the parts of the composition.

Fifth. Its insolubility in water renders it peculiarly applicable for coating the inside of lead or iron water-pipes, thereby preventing the water from getting into contact with the metal, by which means the chemical action of the former upon the latter is rendered impossible, and the water is preserved in a state of purity.

Sixth. It is the most perfect lute yet discovered for uniting the different portions of chemical apparatus.

Seventh. It is not acted upon by acids, and will not be affected by any degree of heat short of that which would be required to vitrify it.

Eighth. Its toughness makes it a peculiarly proper substance for coating the backs of large maps or drawings, thereby doing away with the necessity of mounting them on linen.

The composition, when made as described above, is a full black; but should other colors be desired, as they may be for various purposes, the lamp-black may be omitted, and any proper pigment to give the required tint, and that will not change in the process of baking on, may be substituted in its place.

I claim—

The composition described.

JONATHAN H. GREEN.

Witnesses:
JOHN CRUMLY,
THOS. P. HOW.